United States Patent
Kremer et al.

(10) Patent No.: US 12,093,624 B2
(45) Date of Patent: Sep. 17, 2024

(54) METHOD AND DEVICE FOR ESTIMATING THE TEMPERATURE OF A SEMICONDUCTOR ELEMENT, AND COMPUTER PROGRAM

(71) Applicant: Volkswagen Aktiengesellschaft, Wolfsburg (DE)

(72) Inventors: Jean-Paul Kremer, Wolfenbüttel (DE); Udo Hallmann, Lahstedt (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 797 days.

(21) Appl. No.: 17/265,152

(22) PCT Filed: Jun. 25, 2019

(86) PCT No.: PCT/EP2019/066790
§ 371 (c)(1),
(2) Date: Feb. 1, 2021

(87) PCT Pub. No.: WO2020/025220
PCT Pub. Date: Feb. 6, 2020

(65) Prior Publication Data
US 2021/0342512 A1 Nov. 4, 2021

(30) Foreign Application Priority Data
Aug. 2, 2018 (DE) .................... 10 2018 212 870.7

(51) Int. Cl.
*G06F 30/36* (2020.01)
*G01K 7/42* (2006.01)
(Continued)

(52) U.S. Cl.
CPC ............... *G06F 30/36* (2020.01); *G01K 7/42* (2013.01); *G06F 2111/10* (2020.01); *G06F 2119/08* (2020.01)

(58) Field of Classification Search
CPC .. G06F 30/36; G06F 2119/08; G06F 2111/10; G06F 30/31; G06F 30/373;
(Continued)

(56) References Cited

U.S. PATENT DOCUMENTS 8,539,408 B1 * 9/2013 Cheng ................... G06F 30/367
716/110
8,847,427 B2 9/2014 Le et al. ................... 307/9.1
(Continued)

FOREIGN PATENT DOCUMENTS

CN 105224819 A 1/2016 ............. G06F 19/00
CN 105574285 A 5/2016 ............. G06F 17/50
(Continued)

OTHER PUBLICATIONS

C. H. van der Broeck, M. Conrad, R. W. DeDonker, "A thermal modeling methodology for power semiconductor modules", (Herein referred as Broeck et al.) pp. 1938-1944, 2015 (Year: 2015).*
(Continued)

*Primary Examiner* — Kibrom K Gebresilassie
(74) *Attorney, Agent, or Firm* — Slayden Grubert Beard PLLC

(57) ABSTRACT

Semiconductor modules are used for controlling drive motors such as the electric motors of electric vehicles. IGBT modules are one type of such semiconductor modules. During operation, heat losses arise in the power transistors and the diodes of the semiconductor modules, which causes an increase in their temperature. Therefore, the manufacturers of the IGBT modules recommend that the software of a control unit that controls an IGBT module be provided with
(Continued)

a protective function which continuously monitors the temperature of the IGBT module and intervenes as necessary if an unacceptable temperature of a component of the IGBT module is reached. A temperature model is used for the calculation. The manufacturers provide a more accurate higher-order temperature model that however causes an increased amount of computation. According to the proposal, a reduced temperature model is used that is calculated using the balanced truncation method and is optimized for certain working ranges.

16 Claims, 9 Drawing Sheets

(51) Int. Cl.
*G06F 111/10* (2020.01)
*G06F 119/08* (2020.01)

(58) Field of Classification Search
CPC .. G06F 30/38; G06F 2111/00; G06F 2119/22; G01K 7/42
See application file for complete search history.

(56) References Cited

U.S. PATENT DOCUMENTS

| | | | |
|---|---|---|---|
| 9,705,487 B2 | 7/2017 | Cade et al. | |
| 2005/0160387 A1 | 7/2005 | Wang | 716/113 |
| 2013/0049454 A1 | 2/2013 | Le et al. | 307/9.1 |
| 2013/0259092 A1* | 10/2013 | Im | G01K 7/16 374/184 |
| 2014/0239741 A1* | 8/2014 | Cade | H03K 17/14 307/117 |
| 2018/0017612 A1 | 1/2018 | Burton-ccoca et al. | |
| 2019/0285689 A1* | 9/2019 | Degrenne | G01K 1/14 |

FOREIGN PATENT DOCUMENTS

| | | | | |
|---|---|---|---|---|
| CN | 105655984 A | 6/2016 | | H02H 7/12 |
| CN | 106326532 A | 1/2017 | | G06F 17/50 |
| CN | 106960085 A | 7/2017 | | G01R 31/26 |
| CN | 107219016 A | 9/2017 | | G01K 7/22 |
| DE | 10127776 A1 | 1/2003 | | G06F 17/50 |
| DE | 10260106 A1 | 7/2004 | | H02P 1/18 |
| DE | 102012213349 A1 | 2/2013 | | H02M 1/32 |
| DE | 102010014070 B4 | 7/2013 | | B60L 11/18 |
| DE | 102012222481 A1 | 6/2014 | | G01R 31/26 |
| DE | 102019003491 A1 | 11/2020 | | G01N 27/72 |
| EP | 1770851 A2 | 4/2007 | | G01K 7/42 |
| EP | 2615467 A1 | 7/2013 | | G01K 7/01 |
| EP | 3054306 A1 | 8/2016 | | G01K 7/01 |
| JP | 5228830 A | 3/1977 | | G06F 12/00 |
| JP | 2010266439 A | 11/2010 | | G01R 31/36 |
| JP | 5317881 B2 | 10/2013 | | H02M 1/00 |
| JP | 2016080693 A | 5/2016 | | G01R 31/36 |
| WO | 2020/025220 A1 | 2/2020 | | G01K 7/42 |
| WO | 2020/228989 A1 | 11/2020 | | B42D 25/305 |

OTHER PUBLICATIONS

O. Alavi, M. Abdollah, A. H. Viki, "Assessment of Thermal Network Models for Estimating IGBT Junction Temperature of a Buck Converter", (Herein referred as Alavi et al.), pp. 102-107, 2017 (Year: 2017).*
International Search Report and Written Opinion, Application No. PCT/EP2019/066790, 7 pages, Sep. 18, 2019.
German Office Action, Application No. 102018212870.7, 5 pages, Jun. 16, 2020.
Korean Office Action, Application No. 2023017859696, 5 pages, Feb. 22, 2023.
Chinese Office Action, Application No. 201980051442.X, 15 pages, Mar. 8, 2024.
Gawronski, Wodek et al., "Model Reduction in Limited Time and Frequency Intervals," International Journal of Systems Science, vol. 21, No. 2, pp. 349-376.
Gugercin, Serkin et al., "A Survey of Model Reduction by Balanced Truncation and Some New Results," International Journal of Control, vol. 77, pp. 29 pages.
Ghafoor, Abdul et al., "Model Reduction Via Limited Frequency Interval Gramians," IEEE Transactions on Circuits and Systems—I: Regular Paper, vol. 55, No. 9, pp. 2806-2812.
Infineon Technologies AG, "Thermal Equivalent Circuit Modules," 10 pages.
Infineon Technologies AG, "Technical Information : FS800R07A2E3_B31," 11 pages (German w/ English translation).
Ma, Ke et al., "Frequency-Domain Thermal Modeling and Characterization of Power Semiconductor Devices," IEEE Transactions on Power Electronics, vol. 31, No. 10, pp. 7183-7193.
Benner, Peter et al., "Frequency-Limited Balanced Truncation with Low-Rank Approximations," SIAM Journal on Scientific Computing, vol. 38, pp. A471-A499.
Van der Broeck, Christoph H. et al., "Methods for Monitoring 3-D Temperature Distributions in Power Electronic Modules," IEEE Applied Power Electronics Conference and Exposition, pp. 3022-3030.

* cited by examiner

METHOD AND DEVICE FOR ESTIMATING THE TEMPERATURE OF A SEMICONDUCTOR ELEMENT, AND COMPUTER PROGRAM

CROSS-REFERENCE TO RELATED APPLICATIONS

This application claims priority to German Patent Application No. DE 10 2018 212 870.7, filed on Aug. 2, 2018 with the German Patent and Trademark Office. The contents of the aforesaid Patent Application are incorporated herein for all purposes.

TECHNICAL FIELD

The invention relates to a method for estimating the temperature of a semiconductor component, wherein the current temperature is estimated with the assistance of a temperature behavior model. The invention also relates to a correspondingly adapted device, as well as a correspondingly adapted computer program.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Power semiconductor modules are used in many areas of technology—frequency converters, power supplies, inverters and induction hobs to cite examples, and also in drive engineering. As is the case with drive engineering, power semiconductor modules are also increasingly being used in vehicle engineering and will be used even more in the future since the field of electric mobility is continuously growing.

Of particular note are IGBT modules (insulated gate bipolar transistors) that generally contain several power transistors of the IGBT type, and antiparallel-connected power diodes used as freewheeling diodes. They are used in the automotive field for example to control electric drive motors, or in chargers for electric vehicles. Electric components, in particular electric motors, are frequently found in electric vehicles or in vehicles with internal combustion engines for certain comfort functions like windshield wipers, for steering force support, seat adjustment, window lifters, door stays, etc. These components generally contain power semiconductors such as transistors of the MOSFET type. The power semiconductors are controlled by control units that generate corresponding control signals. Generally, the control units have one or more microcontrollers that are correspondingly programmed and generate the control signals.

During operation, heat losses arise in the power transistors and diodes of the IDBT modules that lead to an increase in their temperature. At a higher temperature, the danger exists that a transistor or a diode will be destroyed. Moreover, the temperature cycles lead to a reduction in the life of the component. It is therefore recommended by the manufacturer of the IGBT modules to provide the software of a control unit that controls an IGBT module with a protective function (component protection) which continuously monitors the temperature of the IGBT module and intervenes if necessary if an impermissible temperature of a component of the IGBT module is reached, or even earlier in order to prevent damage. The normal measure is to reduce the power for controlling, up to switching off. Relevant to component protection and life is the barrier junction temperature of the particular semiconductor component.

To enable component protection, the barrier junction temperatures of the individual IGBTs and diodes must either be measured, or be estimated from other available measured variables. Attaching sensors to all components is unfavorable for cost reasons and is also fault-prone. Consequently, a computational model approach is pursued. It is for example possible to estimate the barrier junction temperature from the measured electrical currents and voltages by using a temperature model. To accomplish this, the temperature model is integrated in the software of the control unit, for example in the drive control unit of the vehicle.

The methods and parameters for calculating the barrier junction temperature of the IGBTs and diodes are indicated by the semiconductor manufacturer, for example in the datasheet for the IGBT module. Frequently, the so-called Foster model is used for this (also termed the partial fraction network).

The Foster model represents the thermal impedance between two points, such as the thermal impedance between the barrier junction of a semiconductor and the cooling liquid with which the semiconductor module is cooled. The corresponding temperature differential can be calculated from the thermal impedance and the power loss within the semiconductor, for example the temperature differential between the barrier junction and the cooling liquid.

The reference temperature such as the temperature of the cooling liquid is measured with a temperature sensor. The sums of the reference temperature with the calculated temperature differentials yield the absolute temperatures of the individual semiconductors.

The Foster model can be calculated for a specific IGBT module from the information in the datasheet of the IGBT module. The information in the datasheet relates to a higher order Foster model, typically between 3 and 5. The implementation of this model then results in a large amount of computing.

Moreover, the IGBT modules contain several IGBTs and diodes, which correspondingly further increases the amount of computing. An estimation of the amount of computing results by multiplying the order of the Foster model with the number of semiconductor elements. For example, a three-phase bridge circuit contains 6 IGBTs and 6 diodes, i.e. 12 semiconductor elements. For highly available motor controls with a phase number of 6, 9 or 12 phases, there is an even higher number of semiconductor elements and therefore an even greater amount of computing.

An idiosyncrasy exists for drive applications in which electric motors are controlled. In this case, the amount of computing for estimating the temperature increases with the rotational speed of the electric motor because the phase currents run at a higher frequency. Correspondingly, the thermal losses in the semiconductor also vary at a higher frequency. This necessitates a short computing cycle for the calculations according to the temperature model. In the case of motors of electric vehicles, in particular electric cars, high rotational speeds are needed so that the maximum speed can be achieved. With these motors, the situation is such that they must run over large rotational speed ranges so that a transmission can be omitted. Asynchronous motors can reach nominal rotational speeds of up to 25,000 rotations per minute, whereas synchronous motors enable nominal rotational speeds of about 11,000 rotations per minute.

SUMMARY

There is therefore a need to simplify the calculation of barrier junction temperatures for semiconductor modules to achieve real-time implementation (runtime of the algorithm). In doing so, certain working ranges could also be optimized. Likewise, a sufficient precision in estimating temperature could be provided to enable effective component protection. Corresponding objects exist.

One or more of the objects are achieved by a method for estimating the temperature of a semiconductor module, a corresponding device, and a corresponding computer program according to the independent claims.

Embodiments of the invention are discussed in the dependent claims and the following description.

The details of one or more embodiments are set forth in the accompanying drawings and the description below. Other features will be apparent from the description, drawings, and from the claims.

BRIEF DESCRIPTION OF THE FIGS.

DESCRIPTION

Figure 1:
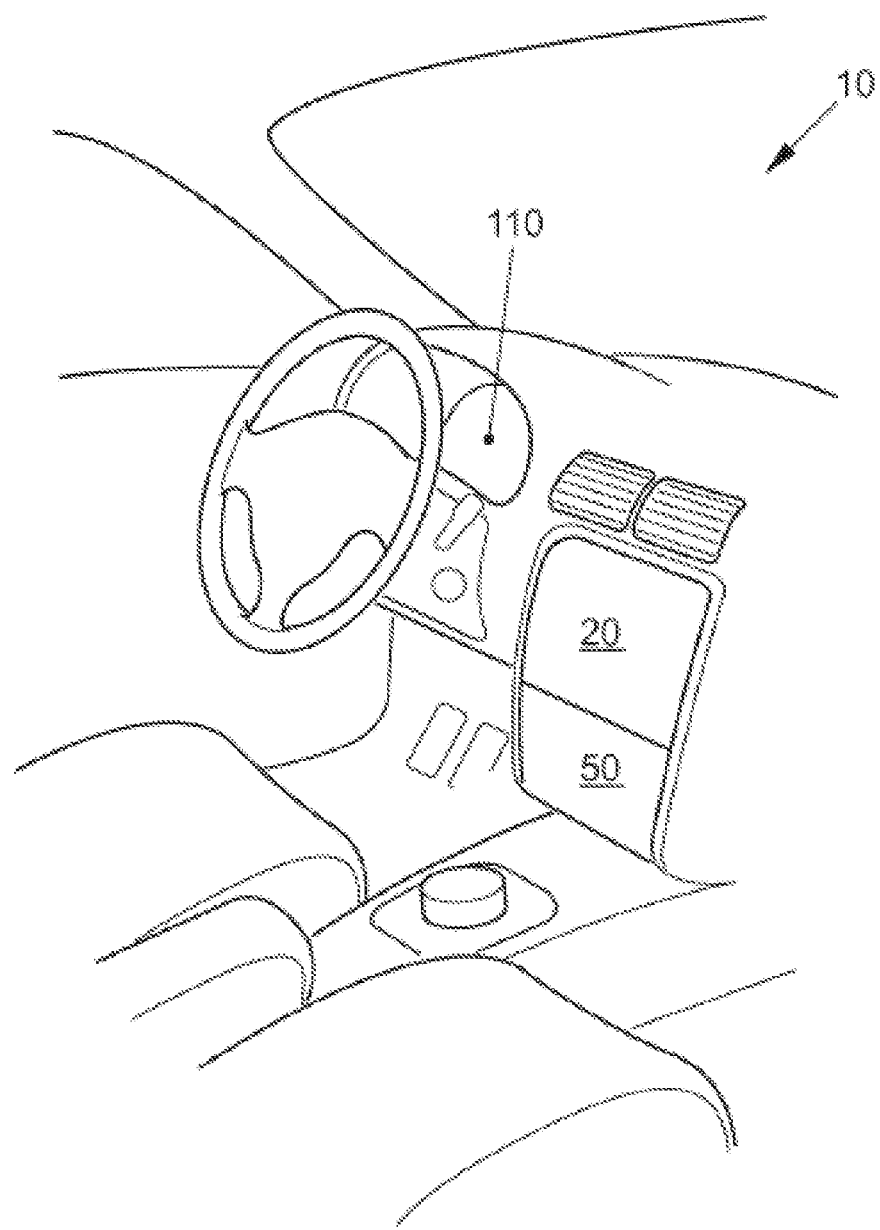
FIG. 1 shows the typical cockpit of a vehicle.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for estimating the temperature of a semiconductor module that is controlled by a computing unit is provided, wherein the temperature estimation is performed in the same or a different computing unit, and wherein the solution is to use a reduced-order version of a temperature model specified for the semiconductor module to estimate temperature.

Frequently the Foster model is used for power semiconductor modules, in particular IGBT modules. This is parameterized in the datasheets of the IGBT module. Typically, this parameterized Foster model that is based on the information in the datasheet, but then causes the increased amount of computing, is implemented in software. According to the present discussion, the model is reduced before the software implementation. Stated specifically, the Foster model is parameterized in the datasheet typically with an order between 3 and 5. A lower-order model is parameterized through the model reduction. With the model reduction, a simplification of the calculation of the barrier junction temperature of semiconductor modules is achieved. The amount of computing is correspondingly reduced.

There are various computing methods for module reduction which are mentioned in the literature. Many of these computing methods may be integrated in the development environments, for example in the control system toolbox of the simulation software Matlab®. A frequently used computing method is the so-called method of balanced truncation. In some embodiments, the reduced version of the Foster model is calculated by the computing method of balanced truncation. This computing method makes it possible to optimize model reduction within specific working ranges (frequency ranges). In this case, the error between the reduced model and the more precise model of a higher order is minimized within the specific frequency ranges. This option is beneficial in some embodiments for the considered application because the thermal losses in IGBT modules frequently occur within specific frequency ranges.

The numeric values for the parameters of the reduced model also result from the computing methods. After the model reduction, software may be implemented using the calculated formulas and parameters. The model reduction may occur when developing the control unit. This may be done in powerful computers and does not need to be performed in the control unit itself. The amount of computing for calculating the reduced model therefore does not play a significant role in the later use of the control unit, but the amount of computing to estimate the temperature according to the reduced model does.

The parameters of the Foster model are typically indicated in the datasheets, wherein the order of the model for IGBT modules is typically between 3 and 5. For a Foster model of the order N, N thermal resistances of $r_1$ to $r_N$ and N thermal time constants $\tau_1$ to $\tau_N$ are indicated as the parameters. The thermal impedance may be calculated using the following formula:

$$Z_{th}(t) = \sum_{i=1}^{N} r_i\left(1 - e^{-\frac{t}{\tau_i}}\right)$$

For example, the thermal impedance is calculated according to the following formula for a model of the fourth order:

$$Z_{th}(t) = r_1\left(1 - e^{-\frac{t}{\tau_1}}\right) + r_2\left(1 - e^{-\frac{t}{\tau_2}}\right) + r_3\left(1 - e^{-\frac{t}{\tau_3}}\right) + r_4\left(1 - e^{-\frac{t}{\tau_4}}\right)$$

The thermal impedance may be represented in an equivalent form as a transfer function from a power loss $P_{Loss}$ to a temperature differential $\Delta T$. The corresponding formula is:

$$H_{Foster}(s) = \frac{\Delta T(s)}{P_{Loss}(s)}$$

wherein s is the Laplace variable.

The transfer function of the parameterized Foster model of order N may be calculated according to the following formula:

$$H_{Foster}(s) = \sum_{i=1}^{N} \frac{\frac{r_i}{\tau_i}}{s + \frac{1}{\tau_i}}.$$

where $r_1$ to $r_N$ are the N thermal resistances of the particular semiconductor element indicated in the datasheets, and $\tau_1$ to $\tau_N$ are the corresponding N thermal time constants, and wherein s is the Laplace variable of the transfer function.

This formula may be converted for a time-discrete calculation. Then the transfer function for time-discrete signals is calculated according to the Z transformation from the transfer function for continuous signals calculated using Laplace transformation. In some embodiments, the following formula is used for the time-discrete calculation:

$$H_{Foster}(z) = \frac{\sum_{i=0}^{N} a_i z^i}{z^N + \sum_{i=0}^{N-1} b_i z^i},$$

where the parameters $a_0, \ldots, a_N$ and $b_0, \ldots, b_{N-1}$ are calculated from the parameters $r_1, \ldots, r_N$ and $\tau_1, \ldots, \tau_N$ as well as from the desired computing cycle. There are several calculation methods for converting from continuous representation to discrete representation. Mentioned in this context are the methods of bilinear transformation, the impulse variance method, and the method of matched-z transformation. For example, the time-discrete transfer function for a Foster model of the fourth order is:

$$H_{Foster,4}(z) = \frac{a_4 z^4 + a_3 z^3 + a_2 z^2 + a_1 z + a_0}{z^4 + b_3 z^3 + b_2 z^2 + b_1 z + b_0},$$

Where the parameters $a_0, \ldots, a_4$ and $b_0, \ldots, b_3$ are calculated from the parameters $r_1, \ldots, r_4$ and $\tau_1, \ldots, \tau_4$ as well as from the desired computing cycle. This formula may also produce a large amount of computing.

If the information in the data sheet corresponds to a fifth-order Foster model, the amount of computing increases further.

In some embodiments, the following formula is used for a time-discrete calculation of the transfer function according to the first-order reduced model:

$$H_{red,1}(z) = \frac{\alpha_1 z + \alpha_0}{z + \beta_0},$$

where $\alpha_0, \alpha_1$, and $\beta_0$ are the calculated parameters according to the balanced truncation method.

In some embodiments, the following formula for a time-discrete calculation of the transfer function according to the reduced second-order model is used:

$$H_{red,2}(z) = \frac{\alpha_2 z^2 + \alpha_1 z + \alpha_0}{z^2 + \beta_1 z + \beta_0},$$

where $\alpha_0, \alpha_1, \alpha_2, \beta_0$ and $\beta_1$ are the calculated parameters according to the balanced truncation method.

In some embodiments, the following formula for a time-discrete calculation of the transfer function according to the reduced third-order model is used:

$$H_{red,3}(z) = \frac{\alpha_3 z^3 + \alpha_2 z^2 + \alpha_1 z + \alpha_0}{z^3 + \beta_2 z^2 + \beta_1 z + \beta_0},$$

where $\alpha_0, \alpha_1, \alpha_2, \beta_0, \beta_1$ and $\beta_2$ are the calculated parameters according to the balance truncation method. The respective parameter sets $\alpha_0, \alpha_1$, and $\beta_0$; $\alpha_0, \alpha_1, \alpha_2, \beta_0$ and $\beta_1$ and $\alpha_0, \alpha_1, \alpha_2, \alpha_3, \beta_0, \beta_1$ and $\beta_2$ are calculated from the parameters $r_1$ to $r_N$ and $\tau_1, \ldots, \tau_N$ as well as the selected computing cycle.

The balanced truncation method allows the model reduction to be optimized within specific frequency ranges. The error between the reduced model and the more precise model of a higher order is minimized within the specific frequency ranges. This option is beneficial for the reduction of the Foster model because the thermal losses in IGBT modules occur within specific frequency ranges. A first frequency range is defined in that the thermal losses within a semiconductor are always positive. The losses therefore contain a steady component, i.e., a component with a frequency of 0 Hz. A second frequency range is defined by the frequency spectrum of the current and voltage within the semiconductor. This spectrum can be derived from the characteristic data of a system; for example, for an application in a drive system, the spectrum depends on the motor rotational speed. Other components of the current and voltage with a higher frequency are caused by the signal shape with which the semiconductor element is controlled. The PWM modulation (pulse width modulation) is mentioned as an example which is frequently used for controlling. The thermal impedance of semiconductors decreases however with the frequency so that the components of the thermal losses with a higher frequency only have a slight effect on the barrier junction temperature. Consequently, the components with a higher frequency can be overlooked for the model reduction. It can at least be tolerated if the thermal impedance estimated with the reduced model contains a slight deviation at a higher frequency. The deviation may only not be too large for it to yield a temperature difference of more than 5 K in comparison to the more precise Foster model of order N.

In some embodiments, a reduced model of a higher order is used in comparison to a reduced model of a lower order for estimating temperature when the deviation within a selected frequency range is greater by an amount of 5 K in comparison to the more precise Foster model of order N when calculating the temperature effect according to the lower order model. This is a good compromise between the required precision of temperature estimation and the avoidance of a large amount of computing.

Further embodiments are shown in the drawings and explained in greater detail in the following with reference to the FIGS.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows the typical cockpit of a vehicle 10. A passenger vehicle is shown. As an electric vehicle, the vehicle 10 is equipped with an electric motor as the drive motor. However, any other type of vehicle is conceivable as the vehicle 10. Examples of other vehicles include: buses, commercial vehicles, in particular trucks, agricultural machines, construction machines, railway vehicles, etc. It is generally possible to use the present teachings in land vehicles, railway vehicles, watercraft and aircraft.

As described at the onset, various electric motors are used for various comfort functions in the vehicle. For this, the solution described here may be less interesting because these electric motors are not permanently in operation while driving, and high temperatures therefore scarcely occur in the semiconductor modules which control them. It is however different with the electric motor that drives the vehicle and the electric motor that is used for the power steering because these electric motors are permanently controlled during operation. Moreover, a display unit of an infotainment system is highlighted with reference signs in FIG. 1. This is a touch-sensitive screen 20 which is attached in the center console.

The touch-sensitive screen 20 is used, in particular, to operate functions of the vehicle 10. For example, it may be used to control a radio, a navigation system, playback of saved songs and/or an air-conditioning system, other electronic apparatuses or other convenience functions or applications of the vehicle 10. Taken together, this is generally referred to as an "infotainment system". In the case of motor vehicles, in particular passenger vehicles, an infotainment system refers to the combination of a car radio, navigation system, hands-free apparatus, driver assistance system and other functions in a central operating unit. The term "infotainment" is a portmanteau of the words "information" and "entertainment". The touch-sensitive screen 20 (touchscreen) is mainly used to operate the infotainment system, wherein this screen 20 can be easily viewed and operated by a driver of the vehicle 10, in particular, but also by a passenger of the vehicle 10. In addition, mechanical operating elements, such as buttons, knobs or combinations thereof, such as push-and-turn knobs, may be arranged in an input unit 50 below the screen 20. Typically, it is also possible to operate parts of the infotainment system using the steering wheel. To do this, the vehicles are equipped with so-called multifunctional steering wheel operation. This unit is not shown separately, but rather is considered part of the input unit 50.

Figure 2:
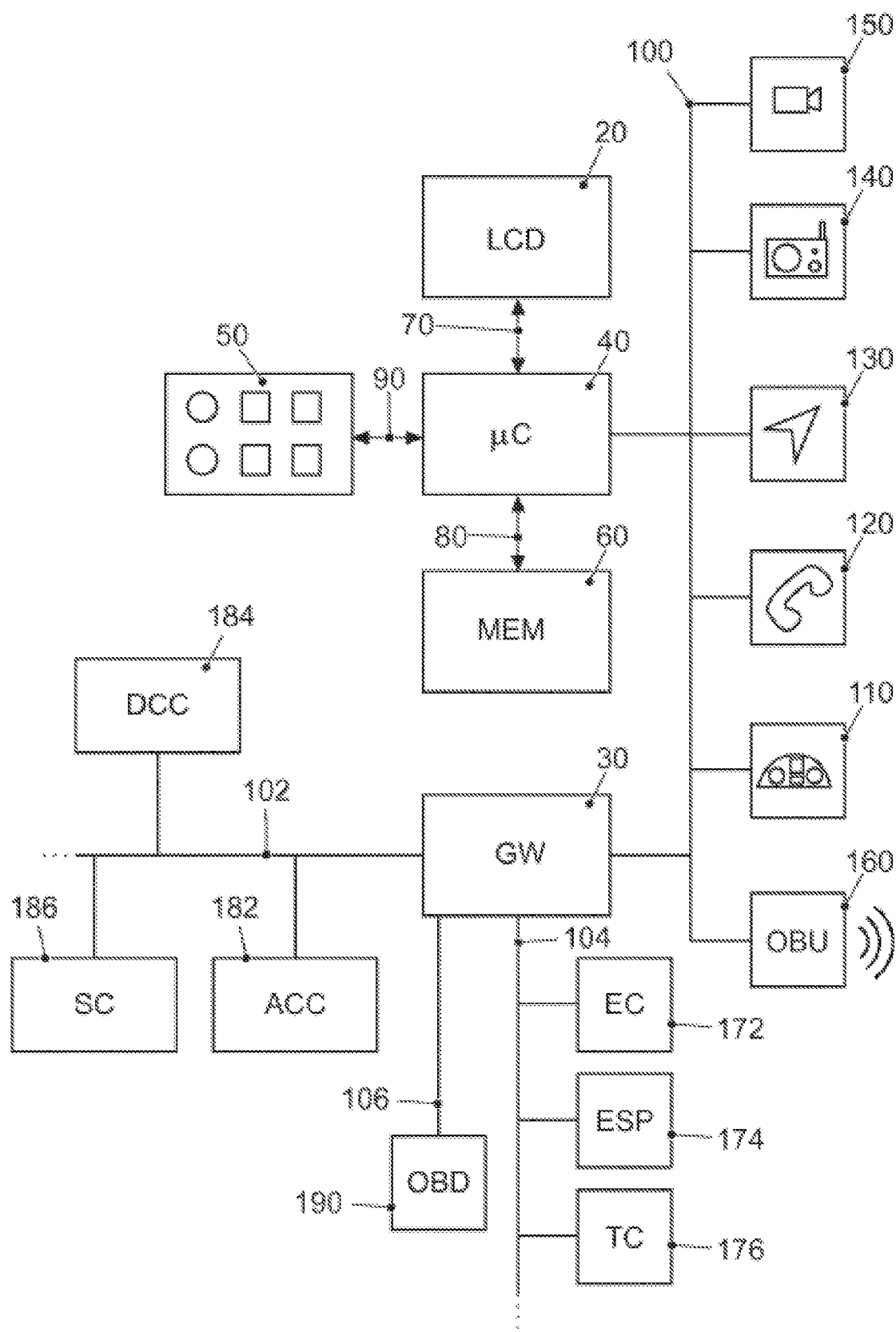
FIG. 2 shows a block diagram of the onboard electronics of a vehicle.

FIG. 2 schematically shows a block diagram of the vehicle electronics and, by way of example, some subsystems or applications of the infotainment system. The infotainment system comprises: the touch-sensitive display unit 20, a computing apparatus 40, an input unit 50 and a memory 60. The display unit 20 comprises both a display surface for displaying changeable graphical information and also a user interface (touch-sensitive layer) arranged over the display surface for the input of commands by means of a user.

The display unit 20 is connected to the computing apparatus 40 via a data line 70. The data line may be designed in accordance with the LVDS (low-voltage differential signaling) standard. The display unit 20 receives control data for controlling the display surface of the touchscreen 20 from the computing apparatus 40 via the data line 70. Control data relating to the input commands are also transmitted from the touchscreen 20 to the computing apparatus 40 via the data line 70. The input unit is denoted by the reference number 50. It includes the already mentioned control elements such as keys, knobs, slide controls or push/twist controls with which the operator can make entries using the menu guide. Input should generally be understood to mean dialing up a selected menu option as well as modifying a parameter, switching a function on/off, etc.

The memory apparatus 60 is connected to the computing apparatus 40 via a data line 80. A pictogram directory and/or symbol directory comprising the pictograms and/or symbols for the possible insertion of additional information is stored in the memory 60.

The other parts of the infotainment system, camera 150, radio 140, navigation device 130, telephone 120 and instrument cluster 110, are connected via the data bus 100 to the device for operating the infotainment system. The highspeed variant of the CAN bus according to ISO standard 11898-2 is conceivable as the data bus 100. Alternatively, a bus system based on Ethernet technology, such as IEEE 802.03cg, may also be used, for example. Bus systems that use optical waveguides for data transmission may also be used. The MOST (Media Oriented System Transport) bus or D2B bus (Domestic Digital Bus) can be cited as examples of this. The vehicle 10 is equipped with a communication module 160 for the inward and outward wireless communication. Said module is often referred to as an on-board unit. It may be configured for mobile telecommunication, e.g., according to the LTE (long-term evolution) standard. Equally, it may be configured for WLAN (wireless local area network) communication, be it for communicating with devices of the vehicle occupants or for vehicle-to-vehicle communication, etc.

The communication bus 100 of the infotainment system is connected to a gateway 30. The other parts of the vehicle electronics system are also connected thereto; on the one hand, the communication bus 104 of the drive train which is typically realized in the form of the CAN bus. The control units of the drive train, the engine control unit 172, the ESP control unit 174 and the transmission control unit 176, are mentioned and shown as examples. Moreover, the communication bus 102 for driver assistance systems that can be designed in the form of the FlexRay bus. Three driver assistance systems are shown: a driver assistance system 182 for automatic distance control ACC (adaptive cruise control), a driver assistance system DCC for adaptive chassis control 184 (dynamic chassis control), and a power steering system 186. Moreover, a communication bus 106 is also connected to the gateway 30. This connects the gateway 30 to an on-board diagnostic interface 190. The job of the gateway 30 is to perform the format conversions for the different communication systems 100, 102, 104, 106 so that data can be exchanged among them.

Figure 3:
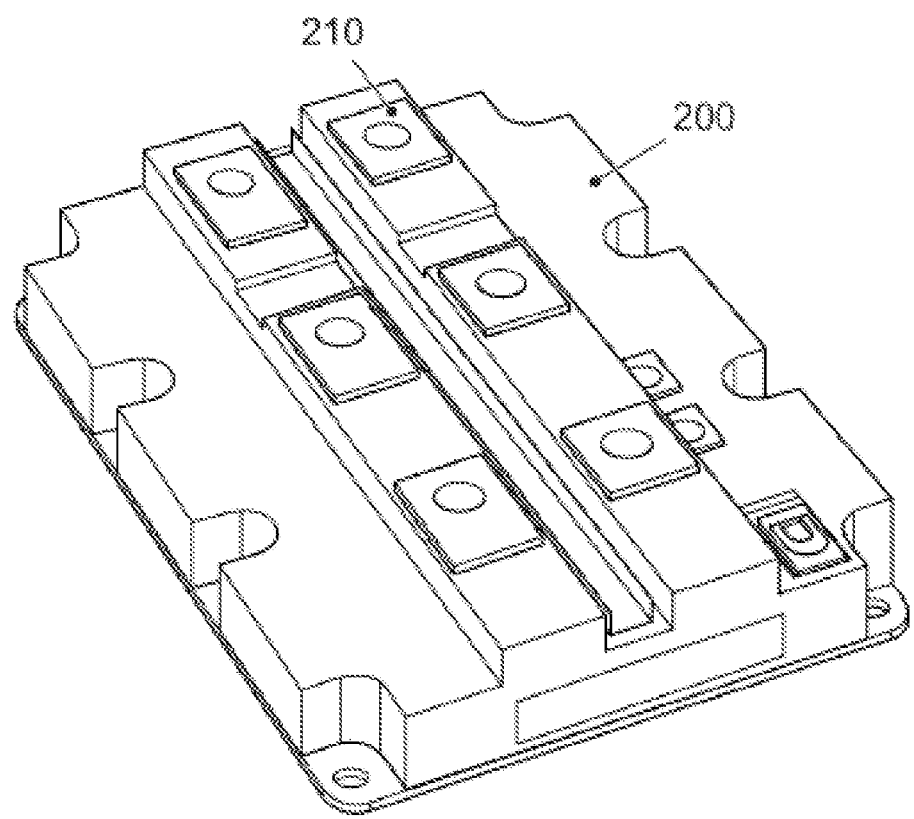
FIG. 3 shows a depiction of a commercially available IGBT module with 6 IGBTs.

The mentioned semiconductor modules are modules with power semiconductors. Such modules are typically designed as IGBT modules (insulated gate bipolar transistor). The IGBT modules are typically attached directly to the particular electric motor. As described, the motor control unit 172 would control the corresponding IGBT module of the drive motor, and the power steering control unit 186 would control the IGBT module of the electric motor of the power steering system. FIG. 3 shows the view of a typical IGBT module with 6 IGBTs. In addition, the IGBT modules contain one freewheeling diode per IGBT which is also a semiconductor element and protects the IGBTs from overvoltages.

The temperature behavior of the particular IGBT module is described in the particular datasheet of the semiconductor module manufacturer.

An example of a datasheet is provided by the company Infineon. It is a datasheet for the IGBT module FS820R08A6P2B. Reference is made therein to the Foster model, and the partial fraction coefficient in the form of r- and τ-pairs is also mentioned.

| Index | Thermal resistances [K/W] | Time constants [s] |
|---|---|---|
| 1 | $r_1 = 0.005$ | $\tau_1 = 0.001$ |
| 2 | $r_2 = 0.05$ | $\tau_2 = 0.03$ |
| 3 | $r_3 = 0.065$ | $\tau_3 = 0.25$ |
| 4 | $r_4 = 0.02$ | $\tau_4 = 1.5$ |

The parameters for a fourth-order Foster model are specified in the datasheet of this module. The parameters are the four thermal resistances $r_1, \ldots, r_4$ and the corresponding four time constants $\tau_1, \ldots, \tau_4$. The transfer function of the Laplace transformation for a fourth-order Foster model within the frequency range (s is the Laplace variable) broken down into partial fractions is:

$$H_{Foster,4}(s) = \frac{\frac{r_1}{\tau_1}}{s + \frac{1}{\tau_1}} + \frac{\frac{r_2}{\tau_2}}{s + \frac{1}{\tau_2}} + \frac{\frac{r_3}{\tau_3}}{s + \frac{1}{\tau_3}} + \frac{\frac{r_4}{\tau_4}}{s + \frac{1}{\tau_4}}$$

For calculating on a digital computer, the continuous transfer function is converted into a time-discrete transfer function. The time-discrete fourth-order model within the z range is:

$$H_{Foster,4}(z) = \frac{a_4 z^4 + a_3 z^3 + a_2 z^2 + a_1 z + a_0}{z^4 + b_3 z^3 + b_2 z^2 + b_1 z + b_0}$$

The parameters $a_0, \ldots, a_4$ and $b_0, \ldots, b_3$ are calculated from the datasheet parameters $r_1, \ldots, r_4$ and $\tau_1, \ldots, \tau_4$ as well as from the computing cycle.

First, the results for model reduction will be presented for a first-order model using the balanced truncation method. A computing cycle of 0.5 ms is assumed for time discretization.

A reduced first-order model is described thus in the z-range:

$$H_{red,1}(z) = \frac{\alpha_1 z + \alpha_0}{z + \beta_0}$$

With the reduced first-order model, the amount of computing is reduced approximately by a factor of 4 (compared with the more precise fourth-order model).

The reduction is optimized for the specified frequency ranges. An inverter for a drive motor in the electric vehicle 10 will be considered as the application. Given the design of the drive, the thermal losses in the semiconductor elements while driving vary within a range of 3.5 to 1000 Hz or, indicated as an angular frequency ω, approximately 22 to 6280 rad/s when the vehicle speed varies. It is noted in this context that the indicated angular frequency does not correspond with the rotational speed of the electric motor. Instead, it is the angular frequency of the power loss in the semiconductor expressed by the unit rad/s. In general, the following conversion formula applies: Angular frequency ω=2π*f, where f corresponds to the frequency in Hz.

The reduced models are therefore optimized for the two following frequency ranges in the shown example:
steady component of the power loss: 0 to 0.01 Hz (angular frequency of 0 to 0.0628 rad/s)
variable frequency of the power loss within the driving range: 3.5 to 1000 Hz (angular frequency of 22 to 6280 rad/s).

By way of comparison, it is noted in this context that the numbers 3.5 Hz and 1000 Hz correspond to a driving range of the electric vehicle that extends from walking speed to approximately 70 km/h.

Figure 4:
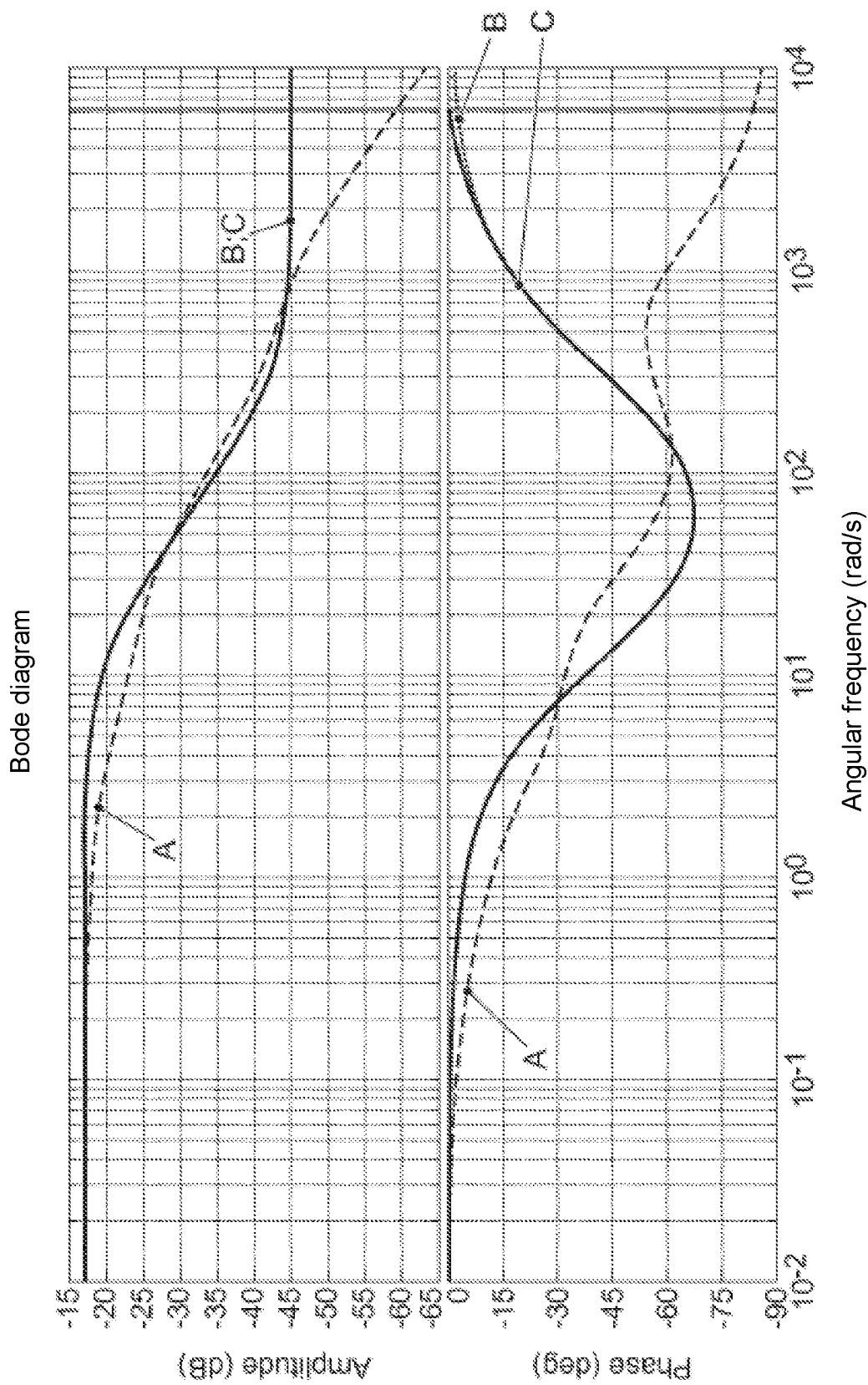
FIG. 4 shows a Bode diagram in which the results of the fourth-order Foster temperature model are depicted in comparison with a first-order reduced model.

FIG. 4 shows the results for the reduced first-order model in the form of a Bode diagram. This depicts the amplitude and phase of the transfer function. The angular frequency is indicated on the x-axis in rad/s. In the top part, the amplitude is plotted along the y-axis in decibels, and the phase is plotted in the bottom part in degrees. The curves A correspond to the results for the continuous fourth-order Foster model. The curves B correspond to the results for the reduced continuous first-order model. The curves C correspond with the results for the reduced time-discrete first-order model. It can clearly be seen that the curves coincide very well within the important range of 0 to 0.1 rad/s, and there are no significant deviations from the continuous fourth-order Foster model. This holds true both for the amplitude as well as for the phase. In the top frequency range as of approximately 2000 rad/s, there are deviations both in amplitude and phase. In the two reduced continuous and time-discrete first-order models, there is scarcely any difference in the amplitude. Both curves B and C overlap almost precisely. Only for the phase was a visible difference calculated of around 2000 rad/s and higher. Within a frequency range of 22 to 6280 rad/s, in particular close to 22 rad/s, the precision of the reduced first-order model is insufficient. Given a power loss of 700 W corresponding to the stated maximum performance in the datasheet for the IGBT module, an error of 8.5 K arises for the calculated temperature.

Figure 5:
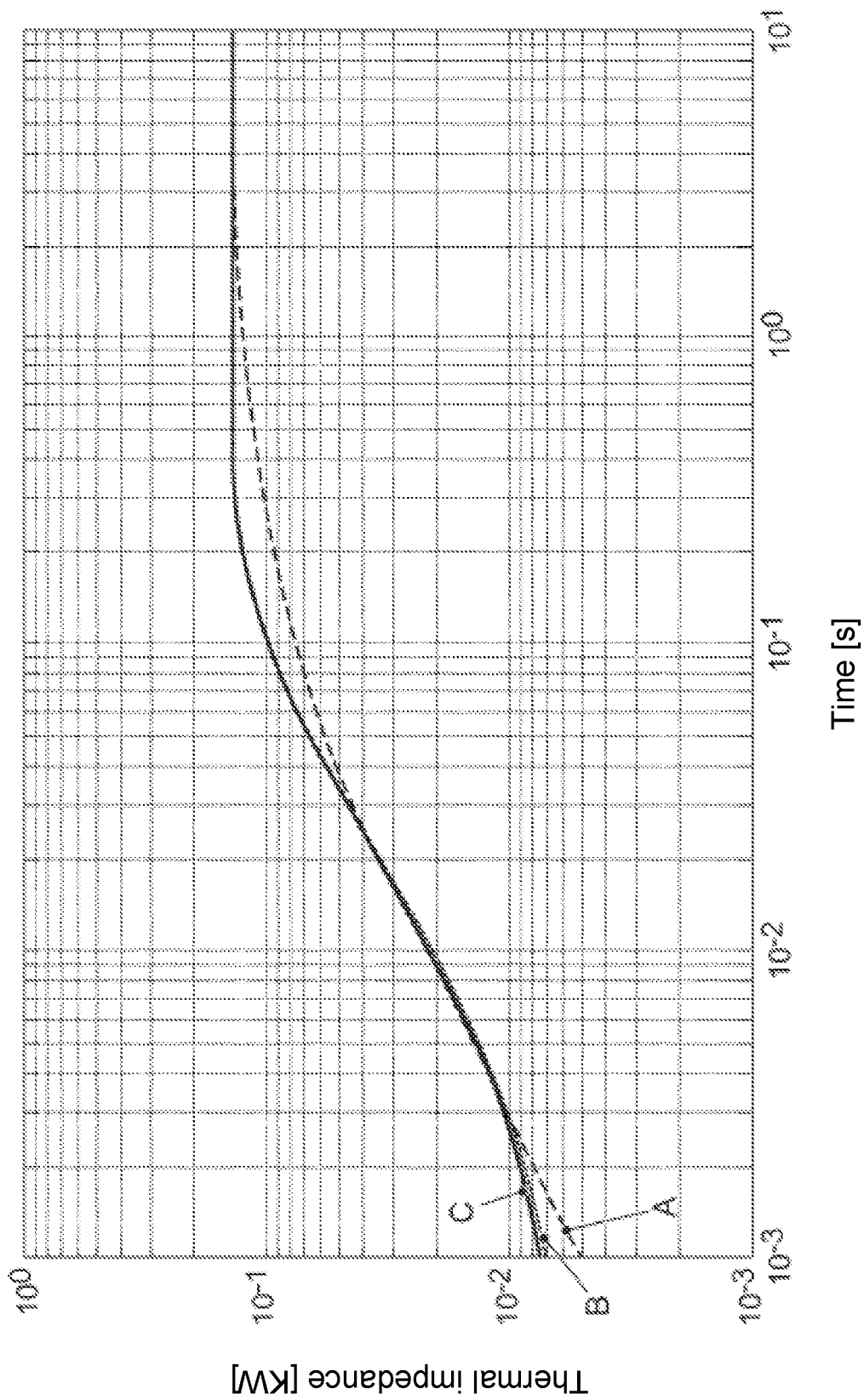
FIG. 5 shows a comparative depiction of the thermal impedance of the models of a fourth-order Foster model and reduced first-order model.

FIG. 5 shows a comparison of the thermal impedances for the reduced first-order models in comparison to the continuous fourth-order Foster model. There is no notable difference between the two reduced models that can be discerned. In both cases, the two curves also almost coincide within the so important range at a low control speed, i.e. at t=4 s with the curve for the fourth-order Foster model.

Figure 6:
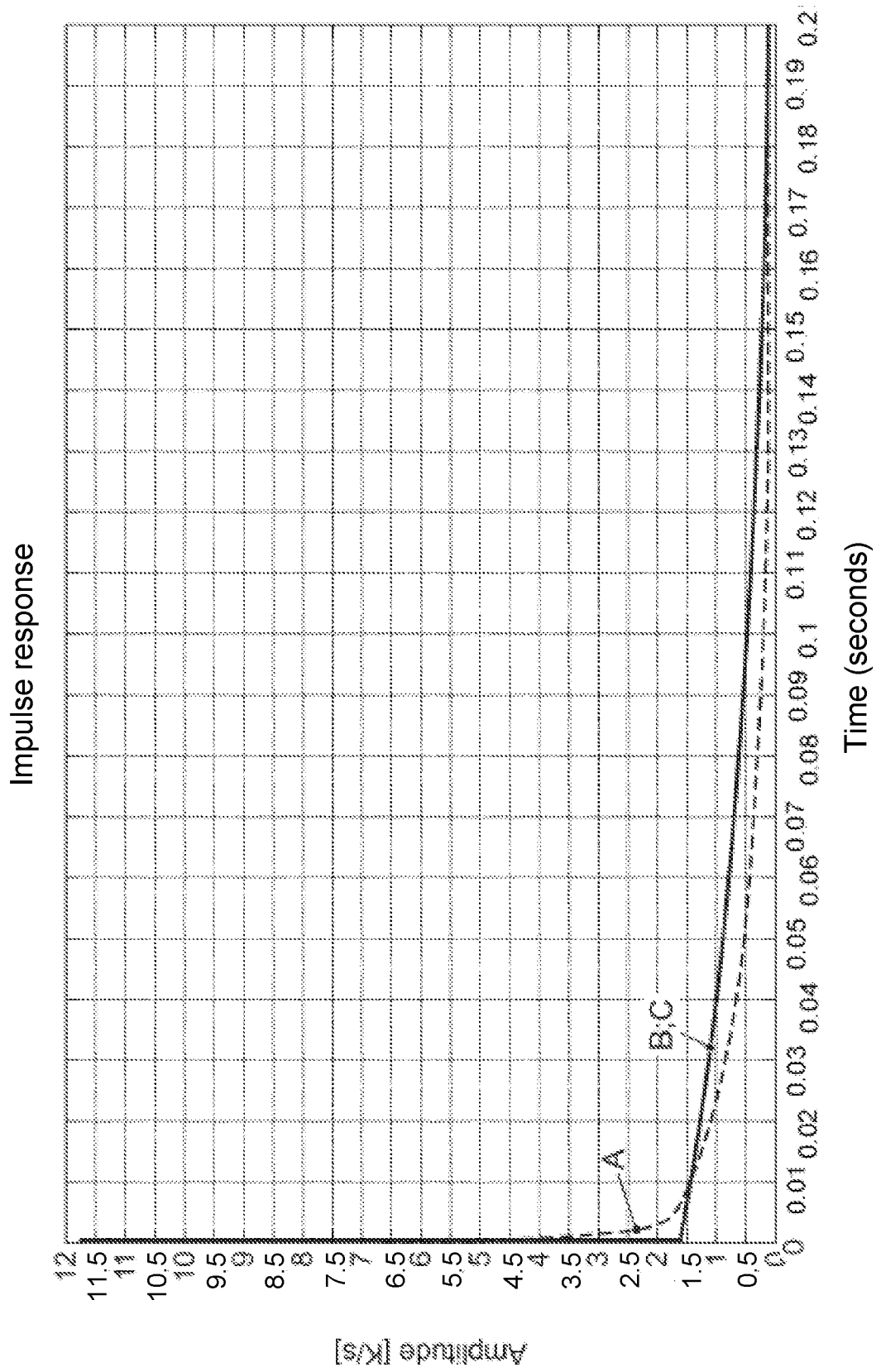
FIG. 6 shows a comparative depiction of the impulse response of the models of the fourth-order Foster model and a reduced first-order model.

FIG. 6 shows a comparison of the impulse responses for the reduced first-order models in comparison to the continuous fourth-order model. There is no notable difference between the two reduced models that can be discerned. In this case as well, the two curves B, C for long time values after the impulse coincide with the fourth-order Foster model. With short time values close to zero, the time-discrete reduced first-order model yields a result of 11.8 K/s in comparison to 7 K/s for the continuous fourth-order Foster model.

For the presented example, a model reduction by the balanced truncation method for a second-order model as a second instance will be presented. The reduced second-order Foster model is described thus in the z-range:

$$H_{red,2}(z) = \frac{\alpha_2 z^2 + \alpha_1 z + \alpha_0}{z^2 + \beta_1 z + \beta_0}$$

With the second-order reduced model, the amount of computing is reduced approximately by a factor of 2 (in comparison to the more precise fourth-order model).

The reduction is optimized for the same frequency ranges as the reduction to the first-order model.

A computing cycle of 0.5 ms is again used for time discretization.

Figure 7:
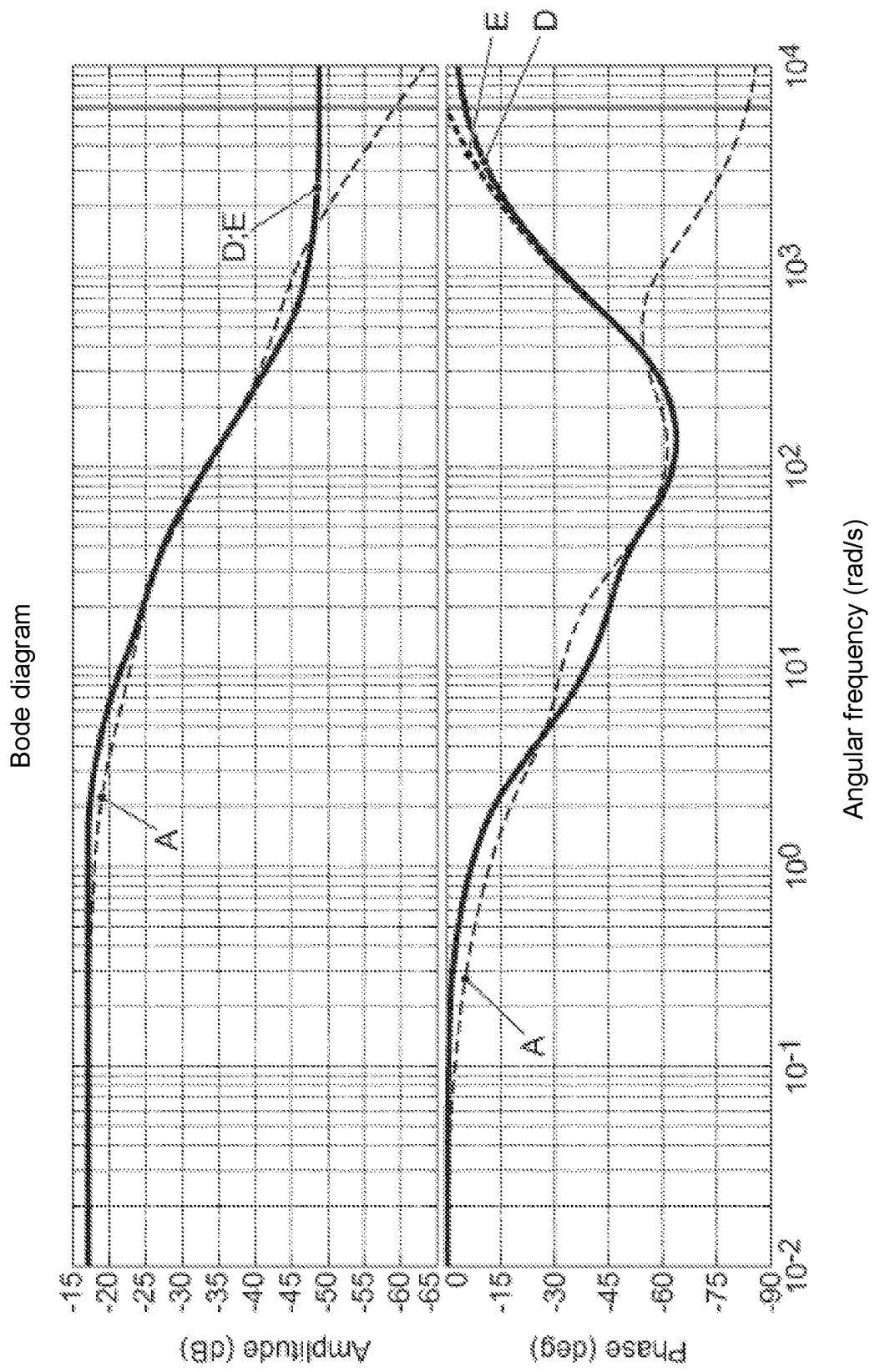
FIG. 7 shows a Bode diagram in which the results of the fourth-order Foster temperature model are shown in comparison with a reduced second-order model.

FIG. 7 shows the results for the second-order reduced model in the form of the Bode diagram. The curves A correspond to the results for the continuous fourth-order Foster model. The curves D correspond to the results for the reduced continuous second-order model. The curves E correspond to the results for the reduced time-discrete second-order model. It is clearly discernible that the curves coincide very well within the important range of 0 to 0.1 rad/s, and there are no significant deviations from the continuous fourth-order Foster model. This holds true both for the amplitude as well as for the phase. In the above frequency range as of approximately 2000 rad/s, there are deviations both in amplitude and phase. With the two reduced second-order models, the continuous and the time-discrete, there is scarcely any difference in amplitude. Both curves D and E overlap almost precisely. Only for the phase was a visible difference calculated in the range of 2000 rad/s and higher. The deviations within the frequency range of 22 to 6280 rad/s are less than is the case with the reduced first-order model. Given a power loss of 700 W corresponding to the stated maximum performance in the datasheet for the IGBT module, the error for the calculated temperature remains less than the amount of 5 K.

Figure 8:
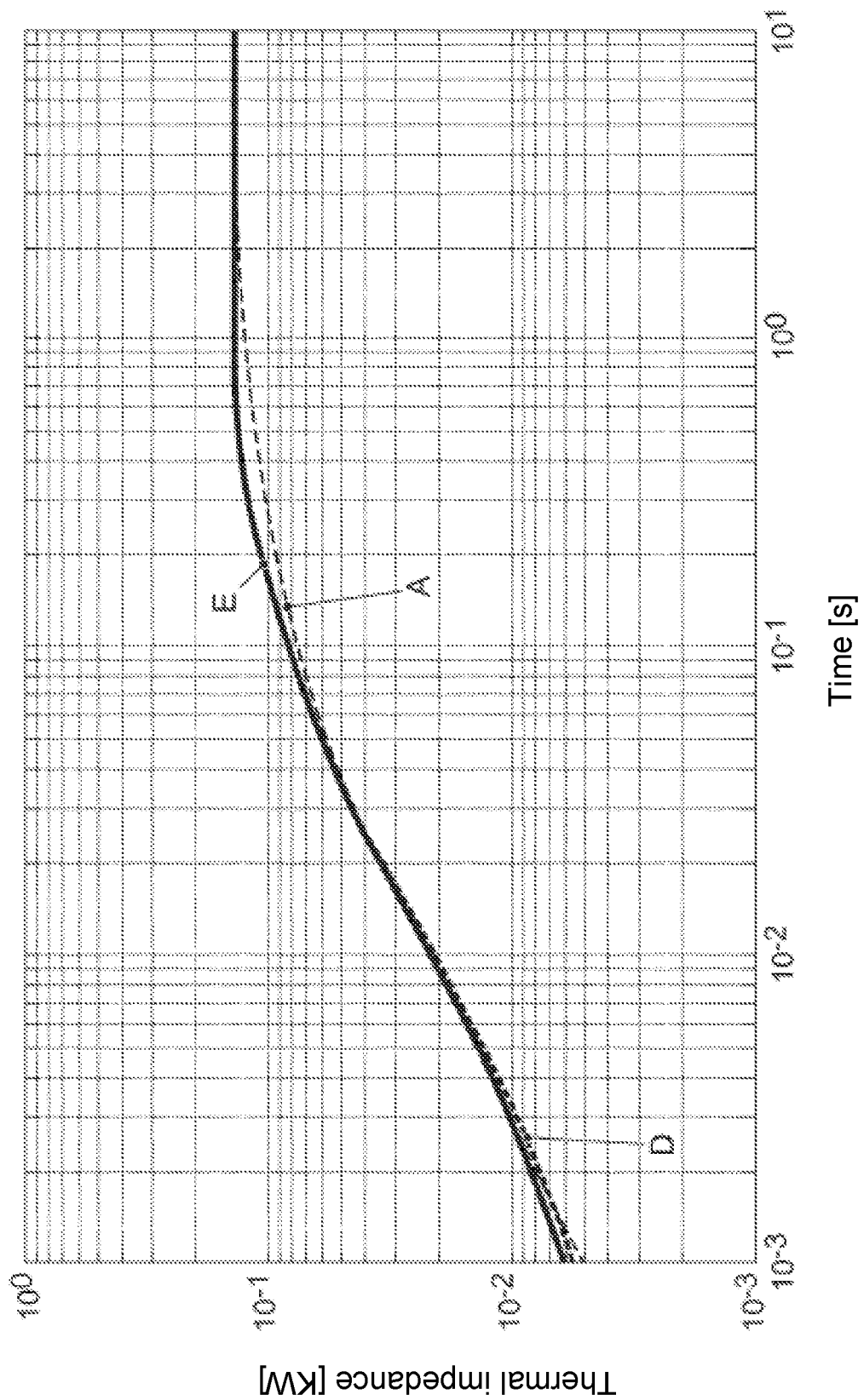
FIG. 8 shows a comparative depiction of the thermal impedance of the models of the fourth-order foster model and a reduced second-order model.

FIG. 8 shows a comparison of the thermal impedances for the reduced second-order models in comparison to the continuous fourth-order model. There is no notable difference between the two reduced models that can be discerned. In both cases, the two curves also almost coincide within the so important range at a low control speed, i.e. at t=4 s with the curve for the fourth-order Foster model.

Figure 9:
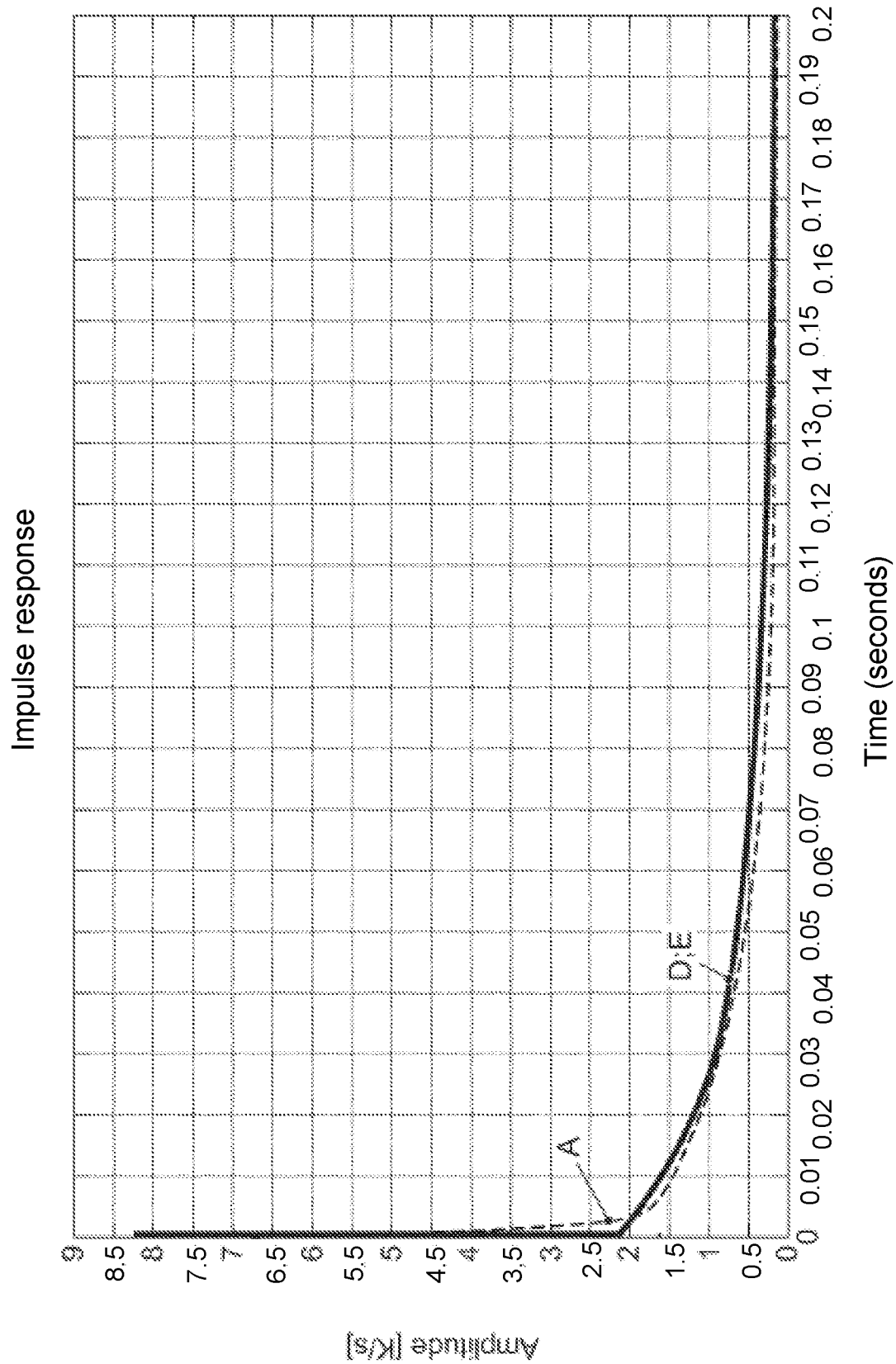
FIG. 9 shows a comparative depiction of the impulse response of the fourth-order Foster model and reduced second-order model.

FIG. 9 shows a comparison of the impulse responses for the reduced second-order models in comparison to the continuous fourth-order model. There is no notable difference between the two reduced models that can be discerned. In this case as well, both curves d), e) for long time values after the impulse coincide with the fourth-order Foster model. With short time values close to zero, the time-discrete reduced second-order model yields a result of 8.2 K/s in comparison to 7 K/s for the continuous fourth-order model. The deviation is less for this model.

Considered overall, the reduced second-order model manifests a greater precision than the first-order model.

The precision of the reduced models is indicated with the supremum norm $\|H(s)\|_\infty$. The second-order model is more precise than the first-order model.

|  | $\|H_{red}(s) - H_{Foster,4}(s)\|_\infty$ |
|---|---|
| First-order model | 0.0419 K/W |
| Second-order model | 0.0229 K/W |

The selection of the order for the reduced model such as the first order or second order results from a compromise between the necessary precision on the one hand and the amount of computing on the other hand. It is recommended as a guideline to always use the higher order reduced model whenever the amount of the deviation within a selected range is greater than 5 K in comparison to the more precise fourth-order Foster model when calculating the temperature effect using the lower order model.

It is moreover possible to check the quality of the reduced models by simulations. The considered power electronics circuit will be simulated for the planned operating conditions. The thermal losses in the semiconductor elements will also be calculated in the simulation. The calculated thermal losses will be used as input variables for the thermal models. This enables a comparison between the more precise higher-order Foster model and the reduced thermal models under near-real conditions.

It should be understood that the methods and the associated devices discussed herein can be implemented in various forms of hardware, software, firmware, special processors or a combination thereof. Special processors may include application-specific integrated circuits (ASICs), reduced instruction set computers (RISCs) and/or field-programmable gate arrays (FPGAs). For example, the proposed method and the device are implemented as a combination of hardware and software. The software may be installed as an application program on a program memory device. Typically, said device is a machine based on a computer platform that comprises hardware, such as one or more central processing units (CPUs), a random-access memory (RAM) and one or more input/output (I/O) interfaces. Typically, an operating system is also installed on the computer platform. The various processes and functions described here may be part of the application program or a part executed by means of the operating system.

The disclosure is not limited to the above-described exemplary embodiments. There is room for various adaptations and modifications that a person skilled in the art would consider based on their knowledge in the art and in connection with the present disclosure.

LIST OF REFERENCE NUMERALS

10 Vehicle
20 Touch-sensitive display unit
30 Gateway
40 Computing unit
50 Input unit
60 Memory unit
70 Data line to display unit
80 Data line to memory unit
90 Data line to input unit
100 1st data bus
102 2nd data bus
104 3rd data bus
106 4th data bus
110 Instrument cluster
120 Telephone
130 Navigation device
140 Radio
150 Camera
160 Communication module
172 Engine control unit
174 ESP control unit
176 Transmission control unit
182 Distance control control unit 184 Chassis control unit
186 Power steering control unit
190 On-board diagnostic plug
200 IGBT module
210 IGBT
A Temperature behavior of fourth-order Foster model (continuous)
B Temperature behavior of reduced first-order model (continuous)
C Temperature behavior of reduced first-order model (time-discrete)
D Temperature behavior of reduced second-order model (continuous)
E Temperature behavior of reduced second-order model (time-discrete)

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for estimating a temperature of a semiconductor element in a vehicle or a vehicle charger, wherein the semiconductor element is controlled by a computing unit, comprising:
performing a temperature estimation of the semiconductor element in the same or a different computing unit, wherein to estimate the temperature, a reduced-order version of a temperature model specified for the semiconductor element is used which is optimized for at least one frequency range;
determining, whether the estimated temperature corresponds to an impermissible temperature range; and
based on the determining, selectively controlling the semiconductor element when the estimated temperature corresponds to the impermissible temperature range; wherein
a higher-order temperature model corresponds to a parameterized Foster model of an order of 3, 4, or 5; and wherein
a reduced model of a higher order in comparison to a reduced model of a lower order is used for performing the temperature estimation when a deviation within a selected frequency range is greater by an amount of 5K in comparison to a more precise Foster model of order n when calculating a temperature effect according to the reduced model of a lower order.

2. The method of claim 1, wherein the reduced version of the temperature model is calculated using a balanced truncation calculation method.

3. The method of claim 1, wherein to further optimize a reduction of the temperature model, two or more separate frequency ranges are specified for the balanced truncation calculation method.

4. The method of claim 1, wherein a parameterized Foster model is calculated according to the following formula:

$$Z_{th}(t) = \sum_{i=1}^{N} r_i \left(1 - e^{-\frac{t}{\tau_i}}\right)$$

where $Z_{th}$ is a thermal impedance,
where t is a time,
where N is the order of the Foster model,
where $r_1$ to $r_N$ are the N thermal resistances of the semiconductor element indicated in a datasheet,
and $\tau_1$ to $\tau_N$ are the corresponding N thermal time constants,
wherein a transfer function of the Foster model is calculated according to the following formula:

$$H_{Foster}(s) = \sum_{i=1}^{N} \frac{\frac{r_i}{\tau_i}}{s + \frac{1}{\tau_i}}$$

where s is a Laplace variable of the transfer function,
where the transfer function is calculated for time-discrete calculation according to the following formula:

$$H_{Foster}(z) = \frac{\sum_{i=0}^{N} a_i z^i}{z^N + \sum_{i=0}^{N-1} b_i z^i}$$

where parameters $a_0, \ldots, a_N$ and $b_0, \ldots, b_{N-1}$ are calculated from the parameters $r_1, \ldots, r_N$ and $\tau_1, \ldots, \tau_N$, as well as from a selected computing cycle.

5. The method of claim 4, wherein the following formula is used for a time-discrete calculation of the transfer function according to the reduced first-order model:

$$H_{red,1}(z) = \frac{\alpha_1 z + \alpha_0}{z + \beta_0}$$

where $\alpha_0$ to $\alpha_1$ and $\beta_0$ are calculated from the parameters $r_1$ to $r_N$ and $\tau_1, \ldots, \tau_N$ as well as from the selected computing cycle.

6. The method of claim 4, wherein the following formula is used for a time-discrete calculation of the transfer function according to a reduced second-order model:

$$H_{red,2}(z) = \frac{\alpha_2 z^2 + \alpha_1 z + \alpha_0}{z^2 + \beta_1 z + \beta_0}$$

where $\alpha_0$ to $\alpha_2$ and $\beta_0$ to $\beta_1$ are calculated from the parameters $r_1$ to $r_N$ and $\tau_1, \ldots, \tau_N$ as well as from the selected computing cycle.

7. The method of claim 4, wherein the following formula is used for a time-discrete calculation of the transfer function according to a reduced third-order model:

$$H_{red,3}(z) = \frac{\alpha_3 z^3 + \alpha_2 z^2 + \alpha_1 z + \alpha_0}{z^3 + \beta_2 z^2 + \beta_1 z + \beta_0}$$

where the parameters $\alpha_0$ to $\alpha_3$ and $\beta_0$ to $\beta_2$ are calculated from the parameters $r_1$ to $r_N$ and $\tau_1, \ldots, \tau_N$, as well as from the selected computing cycle.

8. The method of claim 2, wherein to further optimize the reduction of the temperature model, two or more separate frequency ranges are specified for the balanced truncation calculation method.

9. The method of claim 2, wherein a parameterized Foster model is calculated according to the following formula:

$$Z_{th}(t) = \sum_{i=1}^{N} r_i \left(1 - e^{-\frac{t}{\tau_i}}\right)$$

where $Z_{th}$ is a thermal impedance, where t is a time, where N is the order of the Foster model, where $r_1$ to $r_N$ are the N thermal resistances of the semiconductor element indicated in a datasheet, and $\tau_1$ to $\tau_N$ are the corresponding N thermal time constants, wherein a transfer function of the Foster model is calculated according to the following formula:

$$H_{Foster}(s) = \sum_{i=1}^{N} \frac{\frac{r_i}{\tau_i}}{s + \frac{1}{\tau_i}}$$

where s is a Laplace variable of the transfer function, where the transfer function is calculated for time-discrete calculation according to the following formula:

$$H_{Foster}(z) = \frac{\sum_{i=0}^{N} a_i z^i}{z^N + \sum_{i=0}^{N-1} b_i z^i}$$

where parameters $a_0, \ldots, a_N$ and $b_0, \ldots, b_{N-1}$ are calculated from the parameters $r_1, \ldots, r_N$ and $\tau_1, \ldots, \tau_N$, as well as from a selected computing cycle.

10. The method of claim 3, wherein a parameterized Foster model is calculated according to the following formula:

$$Z_{th}(t) = \sum_{i=1}^{N} r_i \left(1 - e^{-\frac{t}{\tau_i}}\right)$$

where $Z_{th}$ is a thermal impedance, where t is a time, where N is the order of the Foster model, where $r_1$ to $r_N$ are the N thermal resistances of the semiconductor element indicated in a datasheet, and $\tau_1$ to $\tau_N$ are the corresponding N thermal time constants, wherein a transfer function of the Foster model is calculated according to the following formula:

$$H_{Foster}(s) = \sum_{i=1}^{N} \frac{\frac{r_i}{\tau_i}}{s + \frac{1}{\tau_i}}$$

where s is a Laplace variable of the transfer function, where the transfer function is calculated for time-discrete calculation according to the following formula:

$$H_{Foster}(z) = \frac{\sum_{i=0}^{N} a_i z^i}{z^N + \sum_{i=0}^{N-1} b_i z^i}$$

where parameters $a_0, \ldots, a_N$ and $b_0, \ldots, b_{N-1}$ are calculated from the parameters $r_1, \ldots, r_N$ and $\tau_1, \ldots, \tau_N$, as well as from a selected computing cycle.

11. A device for performing the method of claim 1, having a semiconductor module and a computing unit in which a temperature estimation is calculated based on a reduced-order version of a temperature model stated for the semiconductor module.

12. The device of claim 11, wherein the semiconductor module has a plurality of power semiconductor elements.

13. The device of claim 11, wherein the semiconductor module is an IGBT module.

14. The device of claim 12, wherein the semiconductor module is an IGBT module.

15. A non-transitory medium having program code which performs the method steps of claim 1 when processing in a computing apparatus.

16. A method for estimating a temperature of a semiconductor element in a vehicle or a vehicle charger, wherein the semiconductor element is controlled by a processor, comprising:

performing a temperature estimation of the semiconductor element in the same or a different processor, wherein to estimate the temperature, a reduced-order version of a temperature model specified for the semiconductor element is used which is optimized for at least one frequency range;

determining, whether the estimated temperature corresponds to an impermissible temperature range; and based on the determining, selectively controlling the semiconductor element when the estimated temperature corresponds to the impermissible temperature range; wherein a higher-order temperature model corresponds to a parameterized Foster model of an order of 3, 4, or 5; and wherein a parameterized Foster model is calculated according to the following formula:

$$Z_{th}(t) = \sum_{i=1}^{N} r_i \left(1 - e^{-\frac{t}{\tau_i}}\right)$$

where $Z_{th}$ is a thermal impedance, where t is a time, where N is the order of the Foster model, where $r_1$ to $r_N$ are the N thermal resistances of the semiconductor element indicated in a datasheet, and $\tau_1$ to $\tau_N$ are the corresponding N thermal time constants, wherein a transfer function of the Foster model is calculated according to the following formula:

$$H_{Foster}(s) = \sum_{i=1}^{N} \frac{\frac{r_i}{\tau_i}}{s + \frac{1}{\tau_i}}$$

where s is a Laplace variable of the transfer function, where the transfer function is calculated for time-discrete calculation according to the following formula:

$$H_{Foster}(z) = \frac{\sum_{i=0}^{N} a_i z^i}{z^N + \sum_{i=0}^{N-1} b_i z^i}$$

where the parameters $a_0, \ldots, a_N$ and $b_0, \ldots, b_{N-1}$ are calculated from the parameters $r_1, \ldots, r_N$ and $\tau_1, \ldots, \tau_{NN}$, as well as from aselected computing cycle.

* * * * *